United States Patent
Jiang

(10) Patent No.: US 6,798,842 B2
(45) Date of Patent: Sep. 28, 2004

(54) RETRANSMISSION RANGE FOR A COMMUNICATIONS PROTOCOL

(75) Inventor: Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 827 days.

(21) Appl. No.: 09/756,723

(22) Filed: Jan. 10, 2001

(65) Prior Publication Data

US 2002/0097809 A1 Jul. 25, 2002

(51) Int. Cl.[7] .............................................. H04L 27/04
(52) U.S. Cl. ...................................... 375/295; 370/469
(58) Field of Search ................................ 375/295, 358, 375/354; 370/469, 346, 449, 509, 394

(56) References Cited

U.S. PATENT DOCUMENTS 6,272,148 B1 * 8/2001 Takagi et al. ................ 370/469
6,519,223 B1 * 2/2003 Wager et al. ................ 370/216

* cited by examiner

Primary Examiner—Khai Tran

(74) Attorney, Agent, or Firm—Winston Hsu

(57) ABSTRACT

A wireless communications system has a receiver and a transmitter. The receiver has a receiving window having a receiving window size. The receiving window size indicates the number of sequence numbers spanned by the receiving window. The transmitter has a state variable VT(S) that holds a sequence number of a protocol data unit (PDU) to be transmitted that is within a transmitting window of the transmitter. The transmitting window has a configured transmitting window size that indicates a maximum number of sequence numbers spanned by the transmitting window. A beginning value of the transmitting window is held in a state variable VT(A) in the transmitter. A base value that marks a beginning sequence number of the retransmission range is obtained, as well as a head value that marks an ending sequence number of the retransmission range. PDUs with sequence numbers that are sequentially on or after the base value and that are sequentially on or before the head value are capable of retransmission. The head value is given by VT(S)−1. If the value (VT(S)+receiving window size) mod $2^n$ does not land within the range of VT(A) and VT(S)−1, the base value is given by VT(A). Otherwise, the base value is given by (VT(S)+receiving window size) mod $2^n$. In addition, if the sum of the configured transmitting window size and the receiving window size is less than or equal to $2^n$, the base value is given by VT(A).

15 Claims, 5 Drawing Sheets

RETRANSMISSION RANGE FOR A COMMUNICATIONS PROTOCOL

BACKGROUND OF THE INVENTION

1. Field of the Invention

The present invention relates to wireless communications. More specifically, the present invention discloses a method for determining a range of sequence number values for protocol data units that can be retransmitted to a receiver without causing confusion.

2. Description of the Prior Art

In current protocol standards for wireless communications, such as is found in the $3^{rd}$ Generation Partnership Project (3GPP™), Technical Specification Group Radio Access Network, RLC Protocol Specification, layer two protocol data units (PDUs) are sent by a transmitter to a receiver. These PDUs have a format that is well defined by the communications protocol, and which includes a sequence number (SN) whose purpose is described below. PDUs are used to carry either layer two signaling information, or layer 3 data. Please refer to FIG. 1. FIG. 1 is a simplified block diagram of a layer 2 PDU 10. The layer 2 PDU 10 includes a 12-bit SN entry 12, and data 14. The actual internal data structure of the PDU 10 can be quite complicated, but for the purposes of the present invention only the SN entry 12 is of importance. The data 14 may hold layer 2 signaling information, layer 3 data, or a combination of the two, and is not of direct relevance to the present invention.

Please refer to FIG. 2 in conjunction with FIG. 1. FIG. 2 is a block diagram of a wireless communications system 20. The wireless communications system 20 includes a receiver 24 and a transmitter 25. The transmitter 25 sends the PDU 10 to the receiver 24. The wireless environment can be quite noisy, and the receiver 24 may not properly receive the PDU 10. The SN entry 12 within the PDU 10 is used by the receiver 24 to determine if all transmitted PDUs 10 have been properly received. For each PDU 10 holding successive data 14, the transmitter 25 increments the value held within the SN entry 12. By analyzing the SN entries 12, the receiver 24 is able to determine which, if any, PDUs 10 were missed, and may subsequently request the transmitter 25 to retransmit the missed PDUs 10. For example, the transmitter 25 may have a large block of data that the transmitter 25 breaks into 4 PDUs 10, which are then successively transmitted to the receiver 24. The first PDU 10 may have an SN entry 12 with a value of 92. The next PDU 10 would be transmitted with an SN entry 12 of 93, followed by the third PDU 10 with an SN entry 12 of 94, and the last with an SN entry 12 of 95. By analyzing these successive values of the SN entries 12, the receiver 24 is able to reconstruct the data sent by the transmitter 25. If any PDUs 10 are found to be missing, the receiver 24 may explicitly inform the transmitter 25 of which PDUs 10 are to be retransmitted.

Both the receiver 24 and the transmitter 25 have windows within which they expect to receive the PDUs 10 and transmit the PDUs 10, respectively. The receiver 24 has a receiving window 21 that is delimited by two state variables: VR(R) 22, and VR(MR) 23. VR(R) 22 marks the beginning of the receiving window 21, and VR(MR) 23 marks the end of the receiving window 21. The receiver 24 will only accept PDUs 10 that have SN entries 12 that are sequentially on or after VR(R) 22 and sequentially before VR(MR) 23. The SN value held in VR(MR) 23 is not considered to be within the receiving window 21. Similarly, the transmitter 25 has a transmitting window 26 that is delimited by two state variables: VT(A) 27 and VT(MS) 28. VT(A) 27 marks the beginning of the transmitting window 26, and VT(MS) 28 marks the end of the transmitting window 26. The transmitter 25 will only transmit PDUs 10 that have SN entries 12 that are within the range of the transmitting window 26, i.e., that are sequentially on or after VT(A) 27, and sequentially before VT(MS) 28.

The fixed length of the SN entry 12, being 12 bits wide, can lead to confusion as to how to treat sequentiality of the PDUs 10. The SN values 12 of the PDUs 10 have a limited range from zero to 4095, after which the SN values 12 rollover back to zero. Because of this, a PDU 10 with an SN value 12 of four, as an example, may be sequentially after a PDU 10 with an SN value 12 of 4092. Care must be taken when considering the SN values 12 to determine their sequential significance.

The receiving window 21 has a fixed receiving window size. The receiving window size is simply the number of SN values spanned by the state variables VR(R) 22 and VR(MR) 23. That is, VR(MR) 23 is always kept a fixed SN value distance away from VR(R) 22, which may be represented mathematically as:

$$VR(MR)=VR(R)+\text{receiving window size} \qquad (1)$$

Note that equation (1) is a true 12-bit addition, and will suffer from the rollover discussed above. Thus, VR(MR) 23 does not always contain a value that is numerically larger than VR(R) 22. Similarly, the transmitting window 26 has a transmitting window size, VT(WS) 26a, which indicates the number of SN values spanned by the state variables VT(A) 27 and VT(MS) 28. VT(WS) 26a has an initial value that is set to a configured transmitting window size, which is supplied by layer 3. As above, this may be represented mathematically as:

$$VT(MS)=VT(A)+VT(WS) \qquad (2)$$

And again, the result from equation (2) may suffer from rollover. The receiver 24 may explicitly request the transmitter 25 to change the value of VT(WS) 26a. The requested value of VT(WS) 26a cannot be greater than the configured transmitting window size.

As the receiver 24 receives PDUs 10 from the transmitter 25, the receiver 24 will update that value of the state variable VR(R) 22 to reflect the sequentially earliest SN value 12 before which all preceding PDUs 10 have been successfully received. Put another way, VR(R) 22 always holds the SN value 12 of the sequentially earliest PDU 10 that the receiver 24 is waiting to receive. Upon the successful reception of this PDU 10, the receiver 24 advances the state variable VR(R) 22 to the SN value 12 of the next PDU 10 that needs to be received, and the state variable VR(MR) 23 is updated using equation (1) accordingly. In this manner, the receiving window 21 is advanced by the receiver 24 as the PDUs 10 stream in from the transmitter 25. It should also be noted that the transmitter 25 may explicitly request the receiver 24 to advance the receiving window 21 with a layer 2 signaling PDU, but this has no bearing on the present invention.

The transmitting window 26 is advanced when the transmitter 25 receives a layer 2 status PDU from the receiver 24. The layer 2 status PDU holds the most current value of the state variable VR(R) 22, and is sent at periodic intervals by the receiver 24, or in response to an explicit request from the transmitter 25. The transmitter 25 will then set the state variable VT(A) 27 equal to the value held in the status PDU, which in effect sets VT(A) 27 equal to VR(R) 22. The transmitter 25 updates the state variable VT(MS) using equation (2) accordingly. In this manner, the transmitting window 26 and the receiving window 21 move forward with each other in lock step.

The transmitter 25 has an additional state variable VT(S) 29. When the transmitter 25 begins transmitting the PDUs 10 that lie within the transmitting window 26, the transmitter 25 begins with a PDU 10 having an SN value 12 given by the state variable VT(A) 27, and works sequentially forward until it reaches a PDU 10 having an SN value 12 that is equal to one SN prior to VT(MS) 28. That is, the transmitter 25 transmits the PDUs 10 in sequence, beginning at VT(A) 27 and ending at VT(MS)-1. The state variable VT(S) 29 holds the SN value of the next PDU 10 to be transmitted. Thus, the PDUs with SN values on or sequentially after VT(A), and on or sequentially before VT(S)-1 have been transmitted at least one time, and are stored in a retransmission buffer 26b until they are acknowledged by the receiver 24. Note that if a PDU with an SN value equal to VT(A) 27 is acknowledged, VT(A) 27 is updated to the next sequentially earliest SN value within the retransmission buffer 26b.

To increase the probability that the receiving window 21 advances, it is desirable that sequentially early PDUs 10 be retransmitted when retransmission is needed. Unfortunately, the prior art method does not allow the transmitter 25 to capriciously retransmit any PDUs 10 within the retransmission buffer 26b. In fact, in the prior art model, the transmitter 25 may only retransmit PDUs 10 that have been indicated by the receiver 24 as missing. This is due to the vague modulus of the cycling of SN values 12 on the receiver side. That is, it is possible for the receiving window 21 to have advanced up to VT(S) without the transmitter 25 being so informed. If the receiving window 21 is sufficiently wide, and if the transmitter 25 were to retransmit PDUs 10 that had sequentially early SN values 12, it becomes possible for the receiver 24 to mistake old, retransmitted PDUs 10 for new data. Consequently, an exception to this rule is for PDUs 10 having an SN value 12 equal to VT(S)-1, which may always be retransmitted. Additionally, the transmitter 25 may retransmit all PDUs 10 within the retransmission buffer 26b if the initial configured transmitting window size is less than 2048, i.e., less than +e,fra $2^{12}/2$+ee , half the maximum possible value for SN entries 12. Only under these exceptions may the transmitter 25 retransmit PDUs 10. This, however, is a stringent limit on the allowed retransmission range of PDUs 10, which can adversely affect the efficiency of PDU 10 transportation in the communications system 20.

SUMMARY OF THE INVENTION

It is therefore a primary objective of this invention to provide a method for determining an allowed retransmission range of sequence numbers (SNs) in a communications protocol.

Briefly summarized, the method of the present invention discloses a retransmission range of n-bit sized sequence numbers in a wireless communications system. The wireless communications system has a receiver and a transmitter. The receiver has a receiving window having a receiving window size. The receiving window size indicates the number of sequence numbers spanned by the receiving window. The transmitter has a state variable VT(S) that holds a sequence number of a protocol data unit (PDU) to be transmitted that is within a transmitting window of the transmitter. The transmitting window has a transmitting window size that indicates the number of sequence numbers spanned by the transmitting window. A beginning value of the transmitting window is held in a state variable VT(A) in the transmitter. A base value that marks a beginning sequence number of the retransmission range is obtained, as well as a head value that marks an ending sequence number of the retransmission range. PDUs with sequence numbers that are sequentially on or after the base value and that are sequentially on or before the head value are capable of retransmission. The head value is given by VT(S)-1. If the value (VT(S)+receiving window size) mod $2^n$ does not land within the range of retransmission buffer, i.e. between VT(A) and VT(S)-1, inclusively, the base value is given by VT(A). Otherwise, the base value is given by (VT(S)+receiving window size) mod $2^n$. In addition, if the sum of the reconfigured transmitting window size and the receiving window size is less than or equal to $2^n$, the base value is given by VT(A).

It is an advantage of the present invention that by expanding the retransmission range, the transmitter may retransmit a greater number of PDUs, which increases the probability of advancing both the receiving and transmitting windows. The efficiency of PDU transportation in the communications system is therefore improved.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPP™ specification TS 25.322, V3.4.0, is used by way of example. However, it should be clear to one in the art that any wireless communications protocol that requires computing of a retransmission buffer range may benefit from the disclosure of the present invention.

Figure 1:
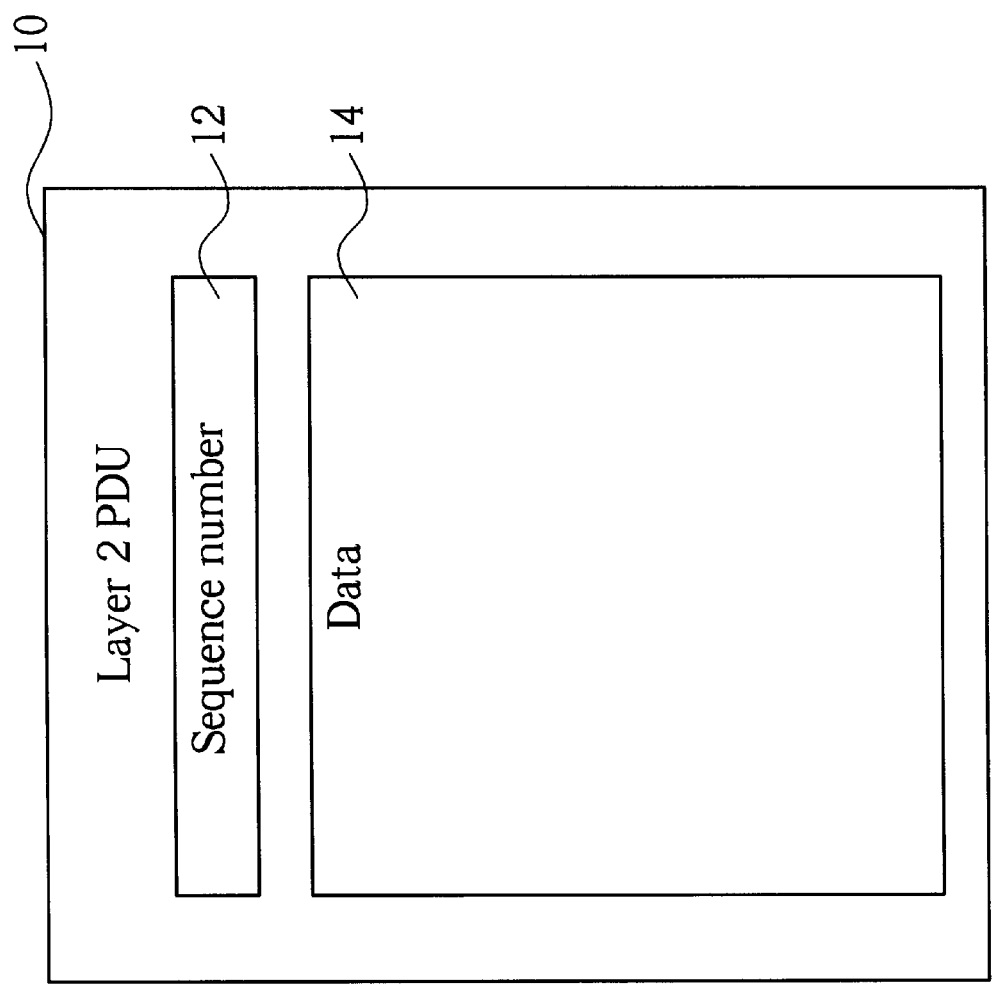
FIG. 1 is a simplified block diagram of a layer 2 protocol data unit (PDU).
Figure 2:
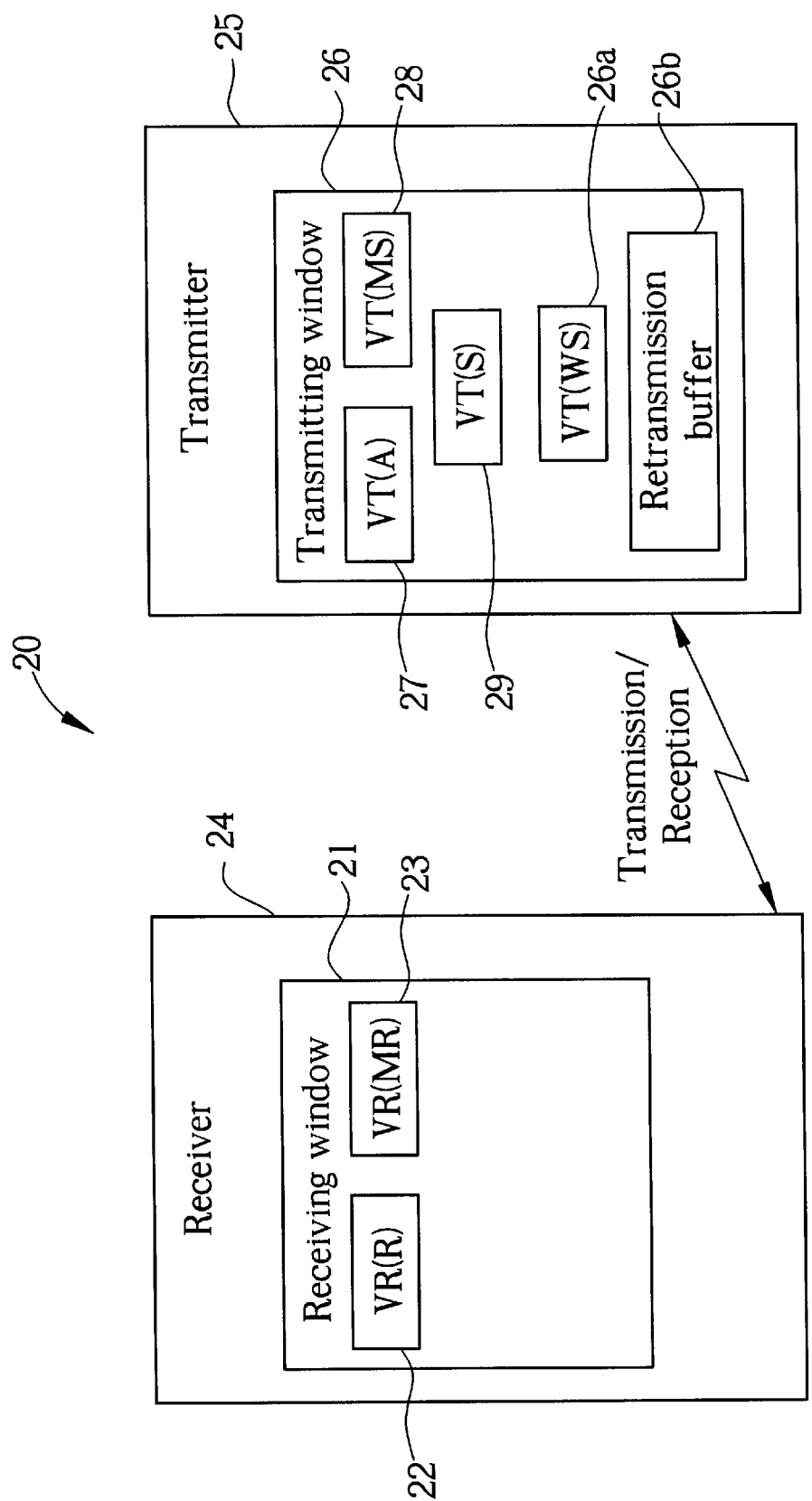
FIG. 2 is a block diagram of a prior art communications system.
Figure 3:
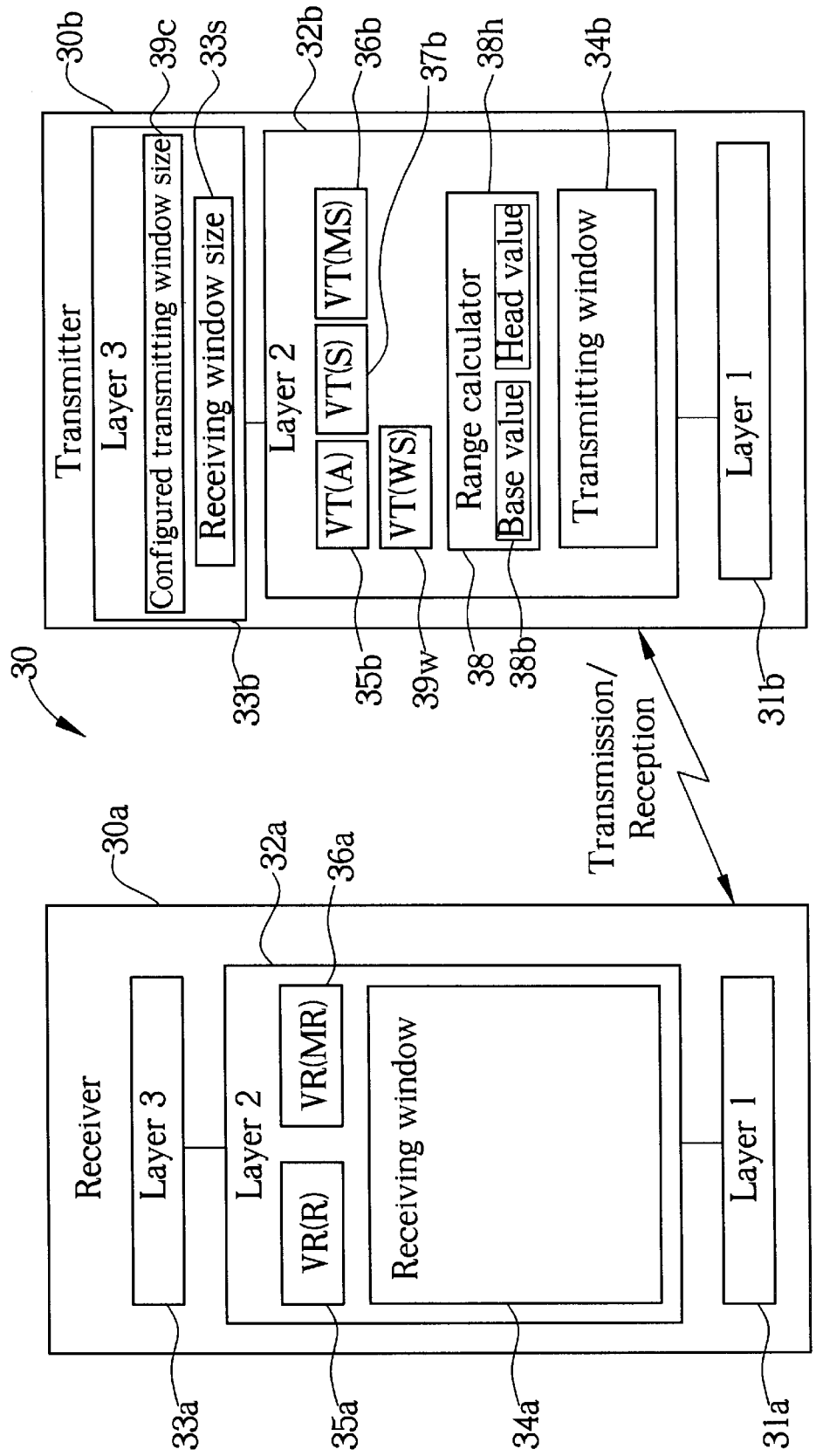
FIG. 3 is a block diagram of a transmission system that utilizes the method of the present invention.

Please refer to FIG. 3. FIG. 3 is a block diagram of a transmission system 30 that utilizes the method of the present invention. In the following discussion, protocol data units (PDUs) are as described in the Description of the Prior Art, and so their form and function do not need to be repeated hereinafter. The present invention communications system 30 utilizes a 3-layer communications protocol, and comprises a receiver 30a and a transmitter 30b. The receiver 30a has a layer 3 interface 33a that receives information from a layer 2 interface 32a. The layer 2 interface 32a, in turn, receives PDUs from a layer 1 interface 31a, which is the physical receiving layer in the receiver 30a. As discussed in the prior art, the receiver 30a has a receiving window 34a that is delimited by two state variables: VR(R) 35a and VR(MR) 36a. VR(R) 35a marks the beginning of the receiving window 34a, and VR(MR) 36a marks the end, exclusively, of the receiving window 34a. The receiver 30a will accept only PDUs with sequence number (SN) values that land within the receiving window 34a. The size of the receiving window 34a is fixed Similarly, the transmitter 30b has a layer 3 interface 33b that sends information to a layer 2 interface 32b. The layer 2 interface 32b sends PDUs to a layer 1 interface 31b, which is the physical transmitting layer for the transmitter 30b. The transmitter 30b has a transmitting window 34b that is delimited by two state variables: VT(A) 35b and VT(MS) 36b. VT(A) 35b marks the beginning of the transmitting window 34b, and VT(MS) 36b marks the end, exclusively, of the transmitting window 34b. The transmitter 30b will transmit only PDUs with SN values that are within the transmitting window 34b. Using certain primitives defined in the communications protocol, the layer 2 interface 32b of the transmitter 30b can communicate with the layer 3 interface 33b to learn the size of the receiving window 34a of the receiver 30a. By learning the receiving window size of the receiver 30a, the transmitter 30b can utilize the method of the present invention. The current size of the transmitting window 34b is given by a state variable VT(WS) 39w. Initially, the state variable VT(WS) 39w is set by the layer 3 interface 33b to a maximum value, the configured transmitting windows size 39c. The layer 2 interface 32a of the receiver 30a may later request the layer 2 interface 32b of the transmitter 30b to change the size of the transmitting window 34b. That is, the receiver 30a may request the transmitter 30b to change the value held in the state variable VT(WS) 39w. VT(WS) 39w, however, can never be changed to exceed the configured transmitting window size 39c. The configured transmitting window size 39c is the maximum value for the size of the transmitting window 34b.

Figure 4:
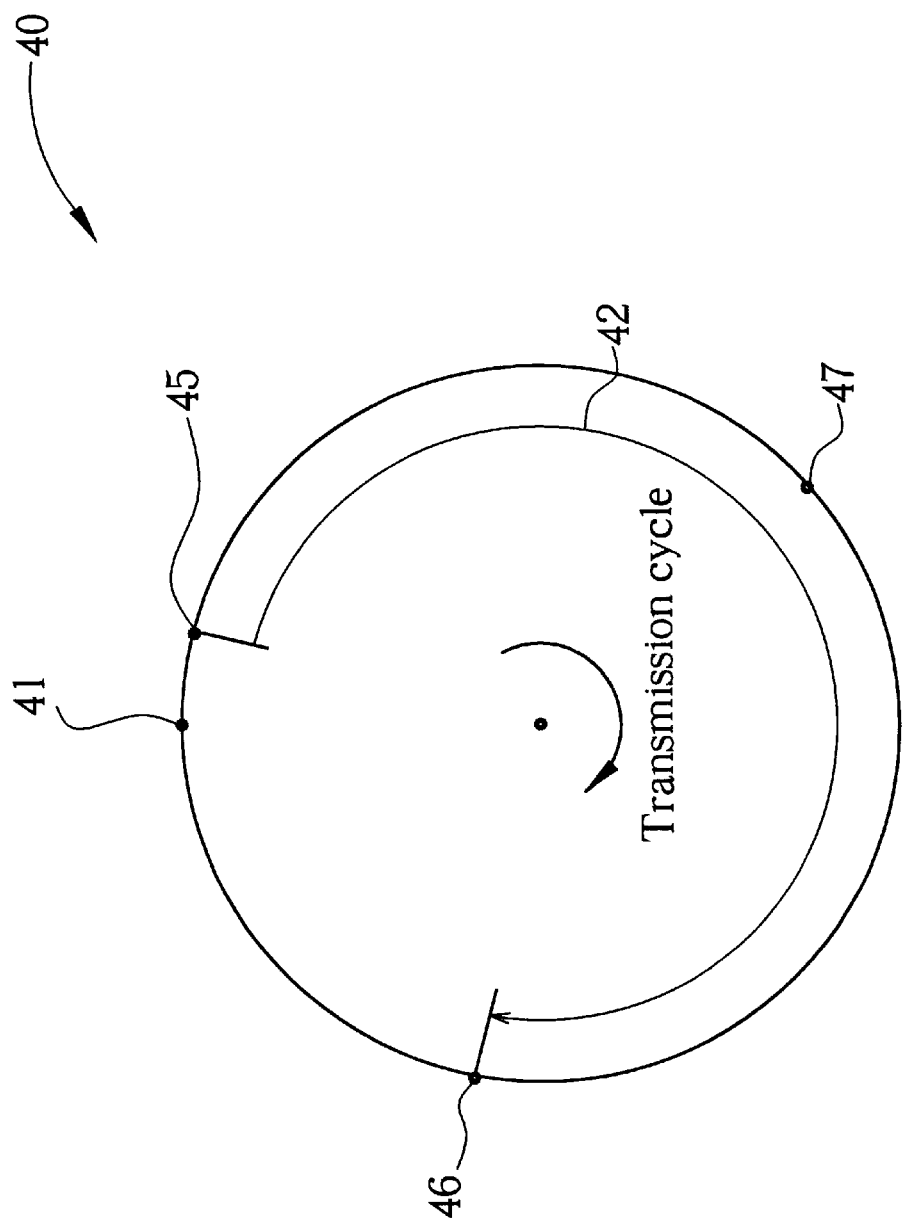
FIG. 4 is a sequence number (SN) phase diagram for a transmitter shown in FIG. 3.

To better understand the method of the present invention, a sequence of transmitting events is depicted. Please refer to FIG. 4 with reference to FIG. 3. FIG. 4 is an SN phase diagram 40 for the transmitter 30b. As discussed in the prior art, the transmitter 30b sends PDUs to the receiver 30a, and each PDU is tagged with an SN. The SNs have a fixed bit length of n bits. In the preferred embodiment, the bit length n is 12. Hence, the SNs have a range of values from zero to 4095 ($2^{12}$-1). The phase diagram for SNs can thus be represented by a circle, as shown in FIG. 3, as the value of 4095 wraps around to the initial value of zero. For the following example, point 41 represents a value of zero for PDU SN values. Point 45 is the sequentially lowest transmitter 30b PDU SN value waiting for acknowledgment from the receiver 30a. That is, point 45 marks the beginning of the transmitting window 34b, and is the value held in the state variable VT (A) 35b, and is a value of 200. Point 46 marks the first PDU SN value that is sequentially past the transmitting window 34b. That is, point 46 marks the position of VT(MS) 36b, which holds a value of 3272. The transmitter 30b will not transmit any PDU that has an SN value sequentially on or after VT(MS) 36b at point 46. Sequentially within the points 45 and 46, i.e., within the transmitting window 34b, which is represented by arc 42, is the point 47, with a value of 1800. Point 47 shows the position of the transmitter 30b state variable VT(S) 37b, which holds the PDU SN value of the next new PDU to be transmitted. That is, the transmitter 30b has already transmitted all PDUs with SN values from VT(A) 35b at point 45 up to, but not including, VT(S) 37b at point 47. With some simple arithmetic, the size of the transmitting window 34b can be found, and in this case, is simply the value of VT(MS) 36b minus the value of VT(A) 35b, or 3272−200=3072. VT(WS) 39w thus holds the value of 3072. In particular, then, the configured transmitting window size 39c must be greater than or equal to 3072, which exceeds the special case condition of 2048 discussed in the prior art.

While the transmitter 30b is in the state shown in FIG. 4, the receiver 30a is in a state that is not necessarily known to the transmitter 30b. For the following discussion, the receiving window 34a of the receiver 30a is assumed to also have a size of 3072. In the first extreme case, it is assumed that the receiver 30a state variable VR(R) 35a is equal to the transmitter 30b state variable VT(A) 35b. Arc 42 thus represents the extents of both the receiving window 34a and the transmitting window 34b. Note that it is impossible for the state variable VR(R) 35a to be sequentially before VT(A) 35b. That is, the starting value of the receiving window 34a cannot be sequentially before the starting value of the transmitting window 34b. This is due to the fact that the transmitting window 34b is advanced when the transmitter 30b sets VT(A) 35b equal to VR(R) 35a upon receipt of a status PDU, which holds the most current value of VR(R) 35a, from the receiver 30a. Consequently, having the state variable VR(R) 35a equal to VT(A) 35b marks the first possible extreme point of the receiving window 34a with respect to the transmitting window 34b. It should be clear that, in this first extreme case, the transmitter 30b may safely retransmit all PDUs with SN values from VT(A) 35b to VT(S) 37b minus one without creating any confusion for the receiver 30a. That is, the first extreme range for retransmission SN values is given by:

$$VT(A) \leq SN \leq VT(S)-1 \qquad (3)$$

Figure 5:
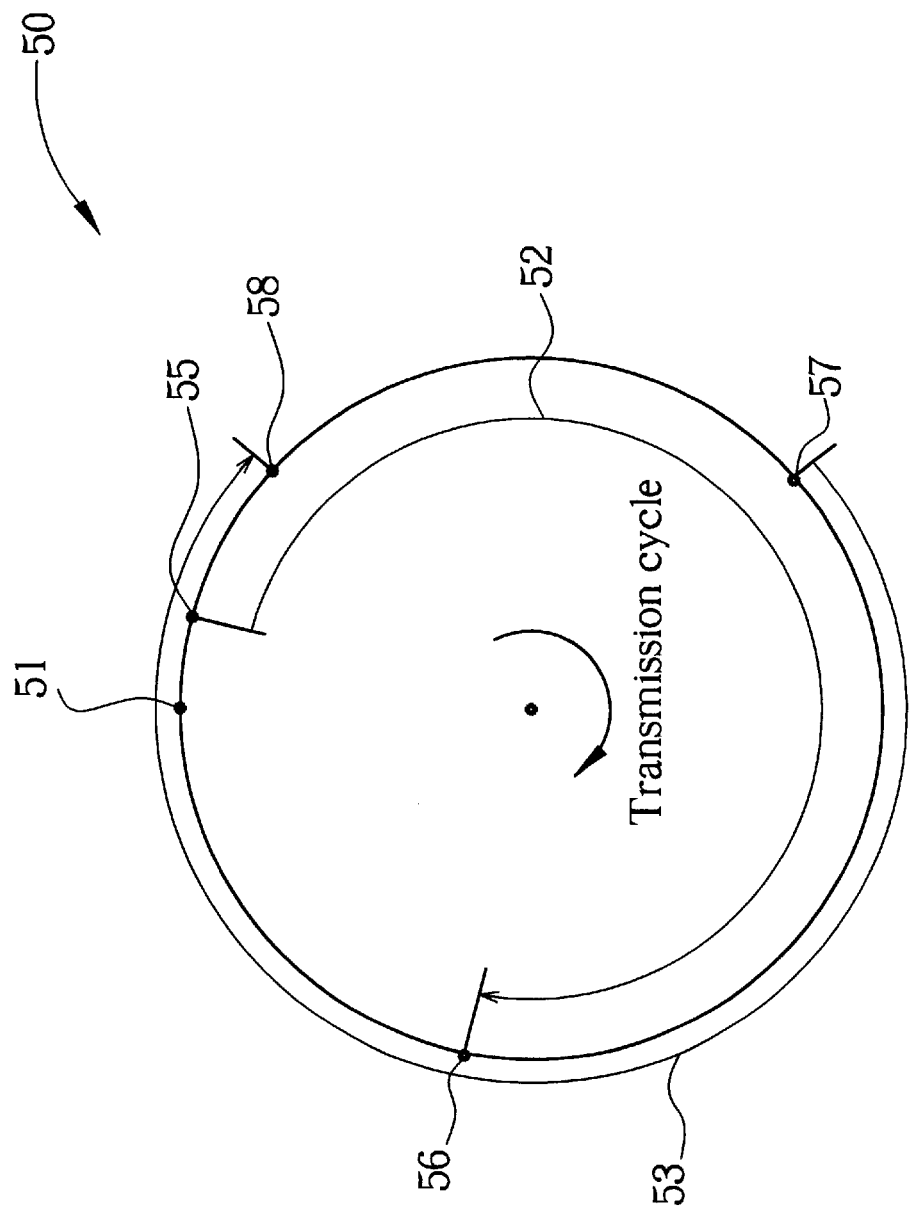
FIG. 5 is an SN phase diagram depicting an extreme case for a receiver and transmitter of FIG. 3.

Please refer to FIG. 5 with reference to FIG. 3. FIG. 5 is an SN phase diagram 50 depicting a second extreme case for the receiver 30a and transmitter 30b. In this second extreme case, the receiver 30a has received all of the PDUs sent by the transmitter 30b. Thus, the receiver 30a state variable VR(R) 35a is equal to the transmitter 30b state variable VT(S) 37b. Point 51 marks an SN value of zero. The transmitter 30b is in the same state as indicated in FIG. 4, and thus has VT(A) 35b equal to 200 at point 55, VT(MS) 36b equal to 3272 at point 56 and VT(S) 37b equal to 1800 at point 57. The transmitting window 34b is thus indicated by arc 52. The receiver 30a, on the other hand, has advanced its receiving window 34a up to point 57, the value of VT(S) 37b. Thus, VR(R) 35a indicates point 57, with a value of 1800. VR(MR) 36a is 3072 SN units beyond VR(R) 35a, and so has a value of 776 ((1800+3072) mod 4096), indicated by point 58. The receiving window 34a is indicated by arc 53. In this second extreme example of FIG. 5, any retransmitted PDUs in the range of 776≦SN≦1799, i.e., from VR(MR) 36a to VT(S) 37b minus one, can be safely retransmitted as they lie outside the receiving window 34a and so will be ignored. However, if PDUs in the range of 200≦SN≦775 are retransmitted, i.e., from VT(A) 35b to VR(MR) 36a minus one, these retransmitted PDUs will lie inside the receiving window 34a and will be incorrectly treated as new PDUs in the next transmission cycle. That is, the tail of the old transmission cycle, which is being used by the transmitter 30b, overlaps the head of the new transmission cycle, which is being used by the receiver 30a. From the above, the allowed retransmission range of SN values for this second extreme case is:

$$(VT(S)+\text{receiving window size}) \mod 2^n \leq SN \leq VT(S)-1 \qquad (4)$$

where n is the bit size of the SNs, and so, in the preferred embodiment, is 12. By substituting in values in the example of FIG. 5, we obtain:

$$(1800+3072) \mod 2^{12} \leq SN \leq 1800-1$$

or $$776 \leq SN \leq 1799,$$

which is exactly what was determined above.

Because equation (4) is suitable for the worst case possibility, it is necessarily suitable for all other potential relationships between receiving windows 34a and transmitting windows 34b. It is the method of the present invention, then, to utilize equation (4) when determining a range of retransmission values for PDUs. A range calculator 38 in the transmitter 30b is used to calculate a base value 38b and a head value 38h. The range calculator 38 obtains a receiving window size value 33s from the layer 3 interface 33b. The receiving window size value 33s holds the size of the receiving window 34a of the receiver 30a. The range calculator 38 sets the head value 38h equal to the value of the state variable VT(S) 37b minus one, i.e.:

$$\text{Head value}=VT(S)-1$$

If the lower bound in equation (4) is not sequentially between VT(A) 35b and VT(S) 37b minus one, inclusively, the range calculator 38 sets the base value 38b equal to the value held in the state variable VT(A) 35b. Otherwise, the range calculator 38 adds the value held in the state variable VT(S) 37b to the receiving window size value 33s. The modulo of this sum with $2^n$ is then set as the base value 38b. That is:

if (VT(S)+receiving window size) mod $2^n$ is sequentially on or after VT(A) and is sequentially on or before VT(S)−1, then
base value=(VT(S)+receiving window size) mod $2^n$
else
base value=VT(A).

For the preferred embodiment, n is 12. The state variable VT(S) 37b cannot sequentially exceed the state variable VT (MS) 36b. VT(MS) 36b is given, in turn, by adding together the state variables VT(A) 35b and VT(WS) 39w. As previously noted, the state variable VT(WS) 39w holds the size of the transmitting window 34b. Because the maximum value for VT(WS) 39w is the configured transmitting window size 39c, a sufficient condition for the base value 38b being equal to the state variable VT(A) 35b is:

(*VT(A)*+configured transmitting window size+receiving window size) mod $2^n$ equals *VT(A)* or is sequentially after both *VT(A)* and *VT(S)*−1 which has a sufficient condition as follows:

$$\text{configured transmitting window size+receiving window size} \leq 2^{(5)}$$

In other words, if the condition shown by equation (5) is true, then the base value 38b is set to the state variable VT(A) 35b. Thus, pseudo-code for the setting of the base value 38b by the range calculator 38 looks like:

if (configured transmitting window size+receiving window size)≦$2^n$, then
base value=VT(A)
else
if (VT(S)+receiving window size) mod $2^n$ is sequentially on or after VT(A) and is sequentially on or before VT(S)−1, then
base value=(VT(S)+receiving window size) mod $2^n$
else
base value=VT(A).

When performing a retransmission of PDUs, the transmitter 30b will only retransmit those PDUs having SN values that are sequentially on or after the base value 38b, and sequentially on or before the head value 38h.

Finally, it should be noted that the present invention is applicable to various wireless environments, such as mobile telephony, personal data assistants (PDAs), handheld radio-transmitters, etc. Also, it should be clear to one skilled in the art that various physical layers are possible for the implementation of layer 1.

In contrast to the prior art, the present invention provides an expanded range of protocol data unit sequence numbers that may be retransmitted. By expanding the possible retransmission range of protocol data units, both the transmitting window and receiving window are more likely to be advanced. The overall efficiency of the communications protocol is therefore improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining a retransmission range of n-bit sized sequence numbers in a wireless communications system, the wireless communications system comprising:

a receiver with a receiving window having a receiving window size, the receiving window size indicating the number of sequence numbers spanned by the receiving window; and a transmitter having a state variable VT(S) that holds a sequence number of a protocol data unit (PDU) to be transmitted;

the method comprising:

obtaining a base value that marks a beginning sequence number of the retransmission range, the base value given by (VT(S)+receiving window size) mod $2^n$; and obtaining a head value that marks an ending sequence number of the retransmission range, the head value given by VT(S)−1;

wherein PDUs with sequence numbers that are sequentially on or after the base value and that are sequentially on or before the head value are capable of retransmission.

2. The method of claim 1 wherein n is 12.

3. The method of claim 1 wherein rollover is capable of causing a first sequence number to be sequentially after a second sequence number, the first sequence number being less than the second sequence number.

4. The method of claim 1 wherein the transmitter obtains the receiving window size of the receiver.

5. The method of claim 4 wherein a layer 3 interface informs the transmitter of the receiving window size of the receiver.

6. A method for determining a retransmission range of n-bit sized sequence numbers in a wireless communications system, the wireless communications system comprising:

a receiver with a receiving window having a receiving window size, the receiving window size indicating the number of sequence numbers spanned by the receiving window; and a transmitter having a state variable VT(S) that holds a sequence number of a protocol data unit (PDU) to be transmitted that is within a transmitting window of the transmitter, the transmitting window having a configured transmitting window size that indicates a maximum number of sequence numbers spanned by the transmitting window, a beginning value of the transmitting window being held in a state variable VT(A);

the method comprising:

obtaining a base value that marks a beginning sequence number of the retransmission range; and obtaining a head value that marks an ending sequence number of the retransmission range;

wherein PDUs with sequence numbers that are sequentially on or after the base value and that are sequentially on or before the head value are capable of retransmission, the head value given by VT(S)−1, and if the sum of the configured transmitting window size and the receiving window size is less than or equal to $2^n$, then the base value is given by VT(A), otherwise if (VT(S)+receiving window size) mod $2^n$ is sequentially on or after VT(A) and is sequentially on or before VT(S)−1, then the base value is given by (VT(S)+receiving window size) mod $2^n$, otherwise the base value is given by VT(A).

7. The method of claim 6 wherein n is 12.

8. The method of claim 6 wherein rollover is capable of causing a first sequence number to be sequentially after a second sequence number, the first sequence number being less than the second sequence number.

9. The method of claim 6 wherein the transmitter obtains the receiving window size of the receiver.

10. The method of claim 9 wherein a layer 3 interface informs the transmitter of the receiving window size of the receiver.

11. A transmitter capable of transmitting layer 2 protocol data units (PDUs) to a receiver, each layer 2 PDU having an n-bit sequence number (SN), the receiver having a receiving window with a receiving window size, the receiving window size indicating the number of sequence numbers spanned by the receiving window, the transmitter comprising:

a state variable VT(S) that holds a sequence number of a PDU to be transmitted;

a transmitting window having a configured transmitting window size, the configured transmitting window size indicating a maximum number of sequence numbers spanned by the transmitting window;

a state variable VT(A) for holding a beginning value of the transmitting window; and a range calculator for calculating a base value and a head value according to the state variable VT(S), the state variable VT(A), the configured transmitting window size, and the receiving window size, the transmitter only transmitting PDUs with SN values that are sequentially on or after the base value and that are sequentially on or before the head value;

wherein the range calculator sets the head value equal to VT(S)−1, and if the sum of the configured transmitting window size and the receiving window size is less than or equal to $2^n$, then the range calculator sets the base value equal to VT(A), otherwise the range calculator sets the base value equal to (VT(S)+receiving window size) mod $2^n$ if (VT(S)+receiving window size) mod $2^n$ is sequentially on or after VT(A) and is sequentially on or before VT(S)−1, otherwise the range calculator sets the base value equal to VT(A).

12. The method of claim 11 wherein n is 12.

13. The method of claim 11 wherein rollover is capable of causing a first sequence number to be sequentially after a second sequence number, the first sequence number being less than the second sequence number.

14. The method of claim 11 wherein the transmitter obtains the receiving window size of the receiver.

15. The method of claim 11 wherein a layer 3 interface informs the transmitter of the receiving window size of the receiver.

* * * * *